(12) United States Patent
Kshirsagar et al.

(10) Patent No.: US 9,683,395 B2
(45) Date of Patent: Jun. 20, 2017

(54) ADVANCED LATCH FOR EMERGENCY OXYGEN CONTAINER DEPLOYMENT

(71) Applicant: B/E AEROSPACE, INC., Wellington, FL (US)

(72) Inventors: Girish Kshirsagar, Overland Park, KS (US); Thomas McDonald, Overland Park, KS (US); Dominic Nadukudiyil, Overland Park, KS (US)

(73) Assignee: B/E Aerospace, Inc., Wellington, FL (US)

( * ) Notice: Subject to any disclaimer, the term of this patent is extended or adjusted under 35 U.S.C. 154(b) by 647 days.

(21) Appl. No.: 14/302,720

(22) Filed: Jun. 12, 2014

(65) Prior Publication Data

US 2014/0367976 A1 Dec. 18, 2014

Related U.S. Application Data

(60) Provisional application No. 61/835,155, filed on Jun. 14, 2013.

(51) Int. Cl.
*B64D 13/00* (2006.01)
*E05C 17/00* (2006.01)
*A62B 7/14* (2006.01)
*A62B 25/00* (2006.01)
*B64D 11/00* (2006.01)

(52) U.S. Cl.
CPC ............... *E05C 17/00* (2013.01); *A62B 7/14* (2013.01); *A62B 25/005* (2013.01); *B64D 11/00* (2013.01); *B64D 2231/025* (2013.01); *Y10T 292/57* (2015.04)

(58) Field of Classification Search
CPC ......... E05C 17/00; A62B 25/005; A62B 7/14; B64D 11/00; B64D 2231/025; Y10T 292/57
See application file for complete search history.

(56) References Cited

U.S. PATENT DOCUMENTS

| | | | | |
|---|---|---|---|---|
| 4,518,179 A | * | 5/1985 | Fenner | A62B 25/005 292/166 |
| 4,706,512 A | * | 11/1987 | McKernon | E05B 81/25 292/336.3 |
| 5,816,244 A | | 10/1998 | Aulgur et al. | |

(Continued)

FOREIGN PATENT DOCUMENTS

EP 2486958 A1 8/2012

OTHER PUBLICATIONS

International Search Report, Sep. 17, 2014, 4 pages, from PCT/US2014/042373, WO2014/201399A1.

*Primary Examiner* — Kristina Fulton
*Assistant Examiner* — Thomas Neubauer
(74) *Attorney, Agent, or Firm* — Shumaker, Loop & Kendrick, LLP

(57) ABSTRACT

An advanced latch for a main door of an aircraft emergency oxygen container can be manually released by a manual release actuator pin to move the main door to an intermediate test position, while pushing the manual release actuator pin further releases the latch completely, causing the main door to open. The latch also can be operated automatically by utilizing a small, lightweight motor or an equivalent pneumatic actuator mechanism to rotate a gear mechanism of the latch.

20 Claims, 8 Drawing Sheets

(56) References Cited

U.S. PATENT DOCUMENTS

| | | | | |
|---|---|---|---|---|
| 6,089,230 A | * | 7/2000 | Barker | A62B 7/08 128/202.26 |
| 6,336,667 B1 | | 1/2002 | Ford et al. | |
| 2002/0030140 A1 | * | 3/2002 | Martinez | B64D 11/00 244/118.5 |
| 2008/0277946 A1 | * | 11/2008 | Rudduck | E05B 47/0009 292/21 |

* cited by examiner

ADVANCED LATCH FOR EMERGENCY OXYGEN CONTAINER DEPLOYMENT

CROSS-REFERENCES TO RELATED APPLICATIONS

This application is based upon and claims priority from U.S. Provisional Application No. 61/835,155, filed Jun. 14, 2013, incorporated by reference in its entirety.

This invention relates generally to personal service units and systems for generation and dispensing of oxygen for use in situations of emergency decompression aboard aircraft, and more particularly relates to an improved latch for a door of an emergency oxygen container allowing the door to be latched in a closed position, to move to an intermediate test position, or to move to an open position.

BACKGROUND

Commercial and military aircraft are commonly equipped with emergency oxygen systems designed to protect users from hazards associated with hypoxia, in case of sudden decompression, typically at altitudes greater than 10,000 feet. Such emergency oxygen systems typically include an emergency oxygen container having a source of supplemental oxygen, and one or oxygen masks for users to receive a flow of supplemental oxygen until the aircraft has descended to a low enough altitude where the supplemental oxygen is not needed.

Conventional oxygen generator and mask systems can be tested by fully deploying the oxygen masks, requiring tedious restowing of the oxygen masks, which can lead to improper packing and improper deployment. Current designs for latching and releasing an emergency oxygen container door have been found to suffer from problems of accidental release, leaks, and binding, from effects of external fluids, effects of poor mask packing on latch reliability, and frequently do not allow for routinization or automation of maintenance checks.

It would be desirable to provide an improved latch for a door of an emergency oxygen container that allows testing for proper functionality without actual full deployment of oxygen masks. It would be desirable to provide an improved latch for a door of an emergency oxygen container that allows for routinization or automation of maintenance checks. The present invention meets these and other needs.

SUMMARY OF THE INVENTION

Briefly, and in general terms, the invention provides for an advanced latch for deployment of an aircraft emergency oxygen container. The latch can be manually released by pushing an external manual release actuator pin, knob or test lever that can be pushed to an intermediate position to move a main door of the emergency oxygen container to an intermediate test position by rotating a gear mechanism, while pushing the manual release actuator pin further releases the latch completely, causing the main door to open. The latch can be operated automatically by utilizing a small, lightweight motor or an equivalent pneumatic actuator mechanism to rotate the gear mechanism of the latch. The latch is an integral part of the aircraft emergency oxygen container that provides a source of supplemental breathable oxygen, and release of oxygen is achieved upon deployment of one or more oxygen masks when the container door opens.

The present invention accordingly provides for a release deployment latch for controlling operation of an aircraft emergency oxygen container having a source of breathable oxygen. The release deployment latch includes a main door of the aircraft emergency oxygen container that is moveable between a closed position, an intermediate test position, and an open position, a latch housing configured to be mounted to an interior of the emergency oxygen container, a spur gear rotatably mounted to the latch housing and having exterior spur gear teeth, and a cam connected to the spur gear. The cam includes an interior channel having an inner cam profile defining a plurality of identical cam paths along a plurality of circular segments with different radii from a center of the cam, and a plurality of balls are disposed within and retained for movement within the interior channel in the cam. The plurality of balls are configured to move radially inwardly and outwardly along the inner cam profile of the interior channel, and the plurality of identical cam paths are configured to cause the plurality of balls to move radially outwards or inwards simultaneously as the cam is rotated. A plunger pin is disposed within and retained for movement within the plurality of balls, and has an outer end configured to engage a portion of the main door. The plunger pin includes a shaft with an outer surface having varying diameters along a length of the shaft of the plunger pin, such that the plurality of balls engage and press against the outer surface of the shaft of the latch plunger pin, and movement of the plurality of balls radially outwards or inwards simultaneously causes the plunger pin to move correspondingly longitudinally outwardly or inwardly in relation to the main door, such that longitudinal movement of the plunger pin can move the plunger pin from an innermost position corresponding to the closed position of the main door, to an intermediate position corresponding to the intermediate test position of the main door, to an outermost position corresponding to an open position of the main door.

A linear gear rack movably mounted to the housing has first and second sides and corresponding first and second rows of gear rack teeth on the first and second sides of the linear gear rack, respectively, and the first row of gear rack teeth are operationally engaged with the exterior spur gear teeth, and manual release gear lever includes manual release gear teeth operationally engaged with the second row of gear rack teeth. The gear rack including an auxiliary arm, and the manual release gear lever including an arm portion.

In a presently preferred aspect, the main door has a first aperture therethrough, and the latch housing has one or more second apertures therethrough. An external manual release actuator pin is moveably mounted for slidable movement through and extending through the first aperture in the main door, and has an exterior end disposed outside the main door, with the external manual release actuator pin extending through the one or more second apertures in the latch housing and having an interior end configured to engage the arm portion of the manual release gear lever. The external manual release actuator pin is moveable between first, second and third inwardly extending positions corresponding to the closed position, intermediate test position, and open position of the main door, respectively, and the external manual release actuator pin is operative to control movement of the plunger pin to effect positioning of the main door from the closed or locked position to the intermediate test position for testing deployment of the supplemental oxygen system, and to the fully opened position for deployment of the supplemental oxygen system. The external manual release actuator pin is operative to push and lift the arm end of the manual release gear lever to rotate the manual release gear level to cause the gear rack to move to cause corresponding rotation of the spur gear and the cam manual operation of the main door. In another presently preferred aspect, a powered actuator is also provided that is engaged with the auxiliary arm of the gear rack and configured to actuate movement of the gear rack to in turn control rotation of the spur gear and cam.

In another presently preferred aspect, the plurality of balls includes three balls, and the plurality of identical cam paths includes three identical cam paths for the three balls. In another presently preferred aspect, the three identical cam paths are positioned 120° apart. In another presently preferred aspect, the plurality of cam paths comprises three short circular segments with three different calculated radii from the center of the cam to achieve a required outward or inward radial movement of the balls.

In another presently preferred aspect, the intermediate position of the plunger pin triggers pressure testing of supplemental oxygen. In another presently preferred aspect, a spring is connected between the arm of the gear rack and the housing to bias the gear rack to a normal resting position and to bias the main door to a closed position.

In another presently preferred aspect, the powered actuator may be a miniature light weight motor, a piezoelectric squiggle motor, or a pneumatic actuator, for example. In another presently preferred aspect, an indicator may optionally be provided at a location within the aircraft emergency oxygen container that is visible to a user when the latch is in the intermediate test position for testing whether the emergency or supplemental oxygen system is functioning and operating as intended. In another presently preferred aspect, the latch may optionally be configured to open the main door as part of an automatic response to sensing of altitude of the aircraft when deployment of the emergency or supplemental oxygen system is required.

Other features and advantages of the present invention will become more apparent from the following detailed description of the preferred embodiments in conjunction with the accompanying drawings, which illustrate, by way of example, the operation of the invention.

DETAILED DESCRIPTION OF THE PREFERRED EMBODIMENTS

Figure 10:
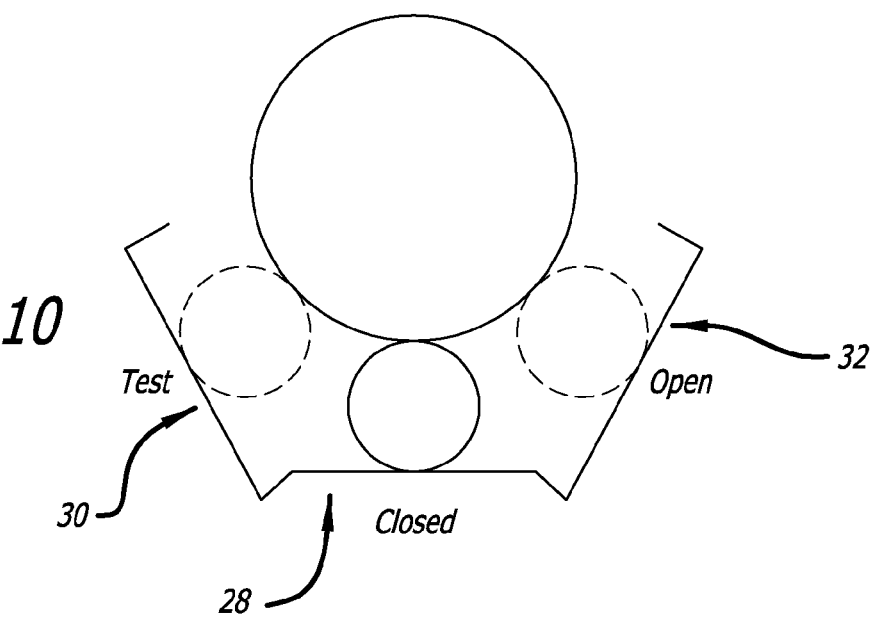
FIG. 10 is a schematic diagram illustrating positions of the main door controlled by the latch assembly of FIG. 1.
Figure 11:
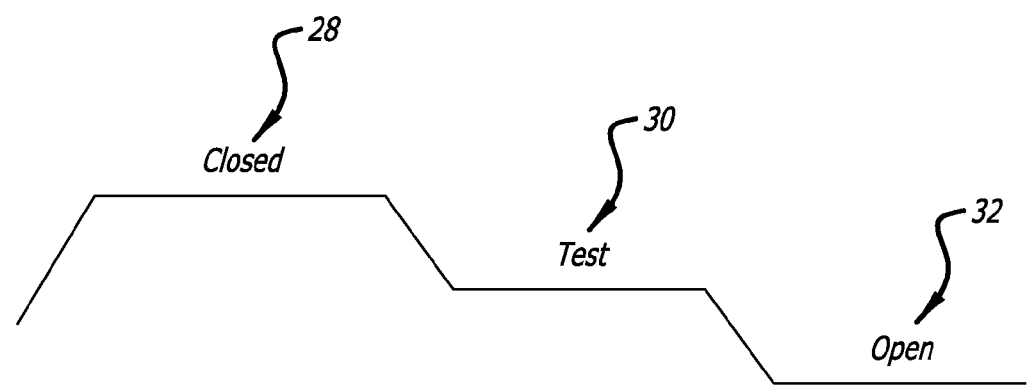
FIG. 11 is a schematic diagram illustrating relative elevation of the positions of the main door controlled by the latch assembly of FIG. 1.

Referring to the drawings, which are provided for purposes of illustration and by way of example, the present invention provides for a release deployment latch 20 for a main door 22 of a modular emergency oxygen container having a source of breathable oxygen for aircraft (not shown). The release deployment latch includes a latch or gear mechanism 26 that controls positioning of the main door in a closed position 28, an intermediate test position 30, and an open position 32, illustrated in FIGS. 10 and 11.

Figure 1:
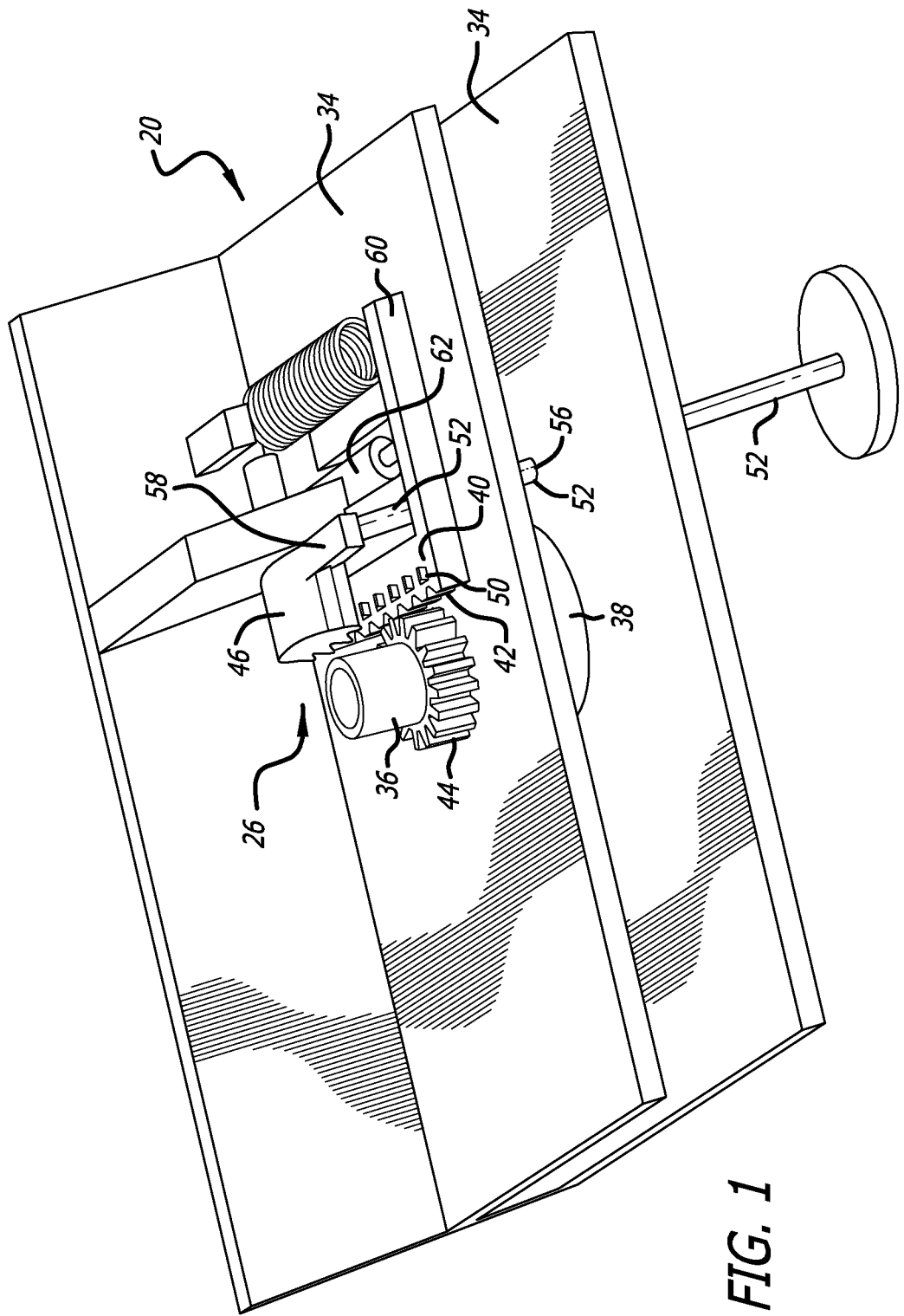
FIG. 1 is a perspective view of the latch assembly according to the present invention.
Figure 2:
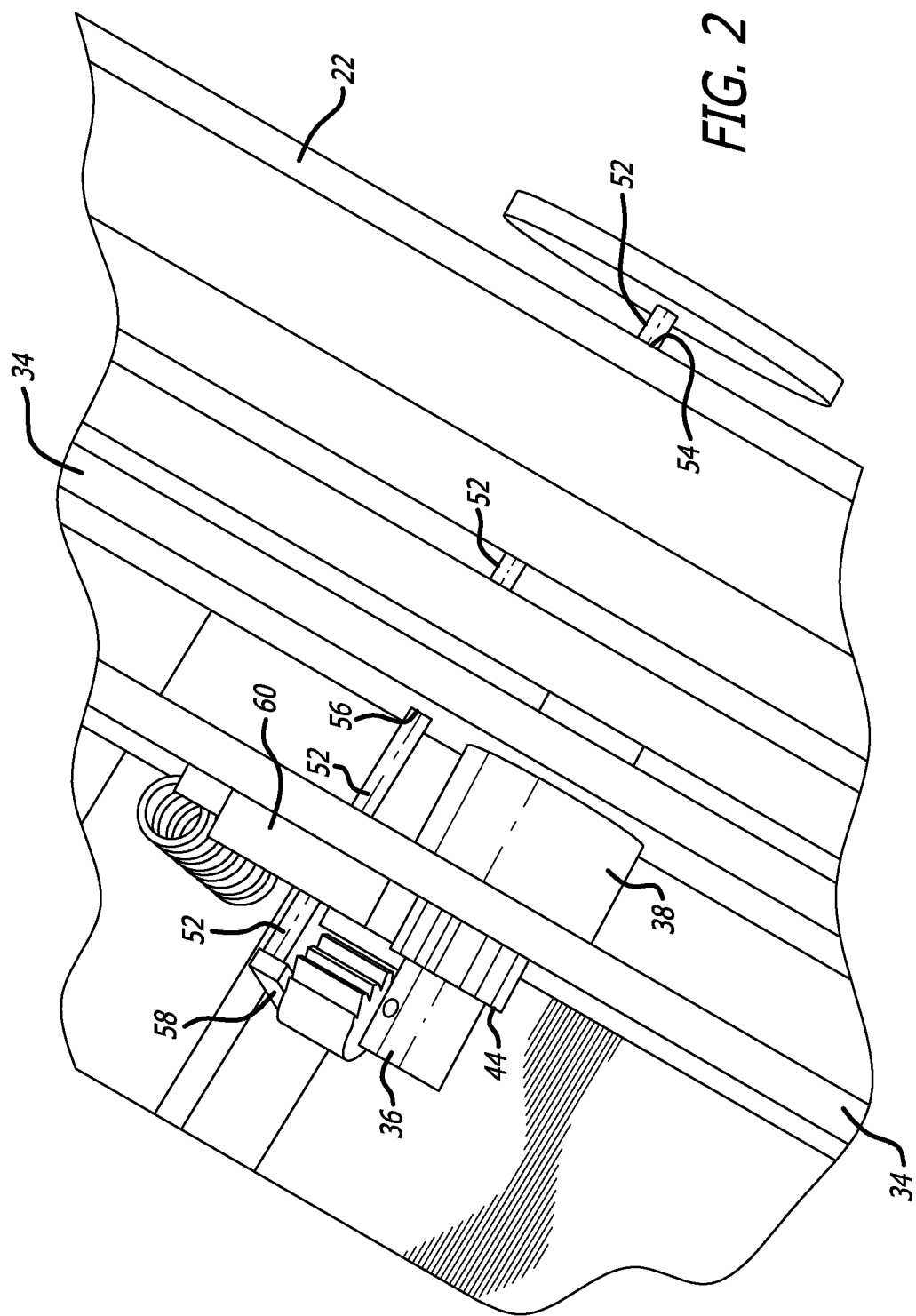
FIG. 2 is a cross-sectional view of the latch assembly of FIG. 1.
Figure 3:
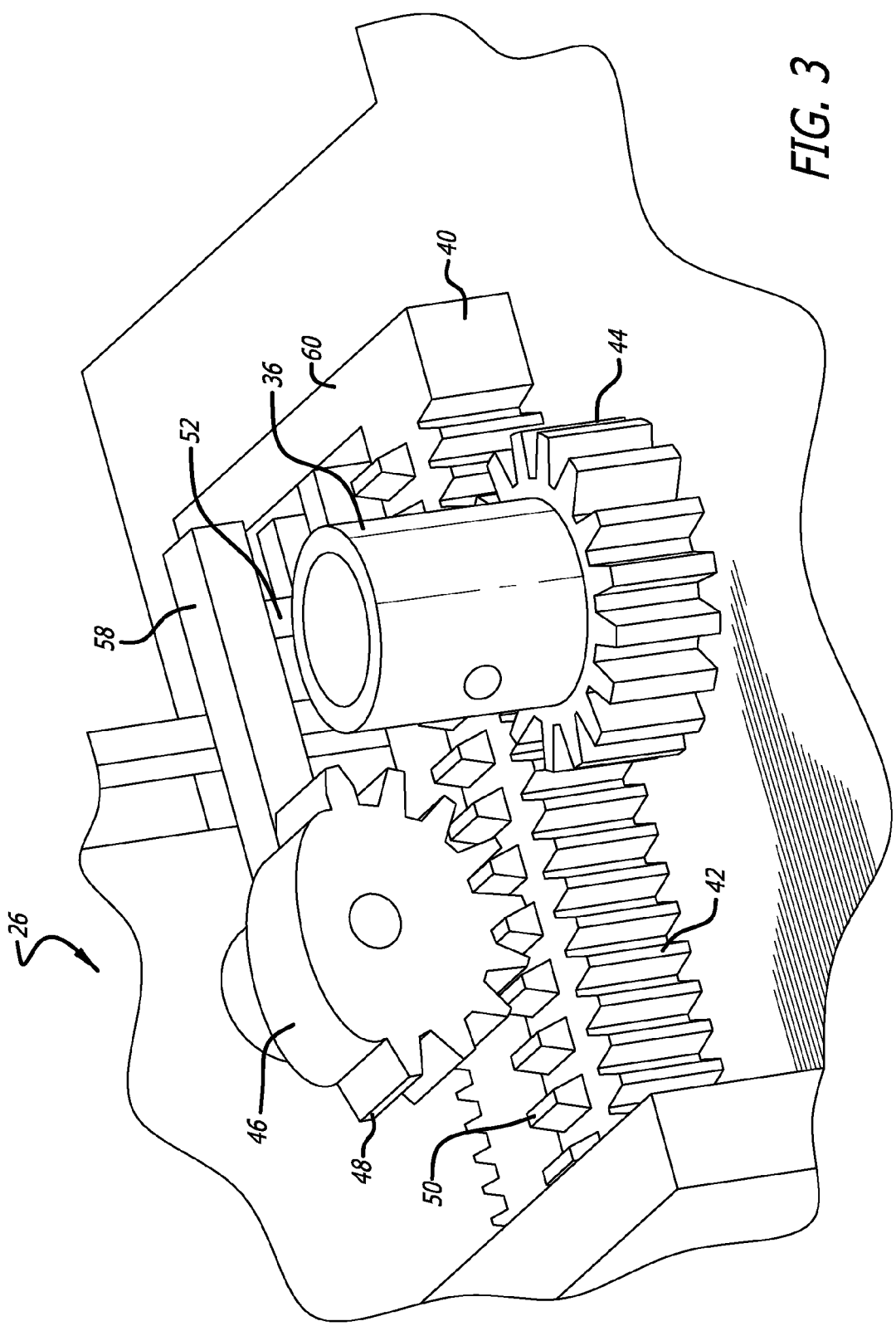
FIG. 3 is an enlarged perspective view of the gear mechanism of the latch assembly of FIG. 1.
Figure 4:
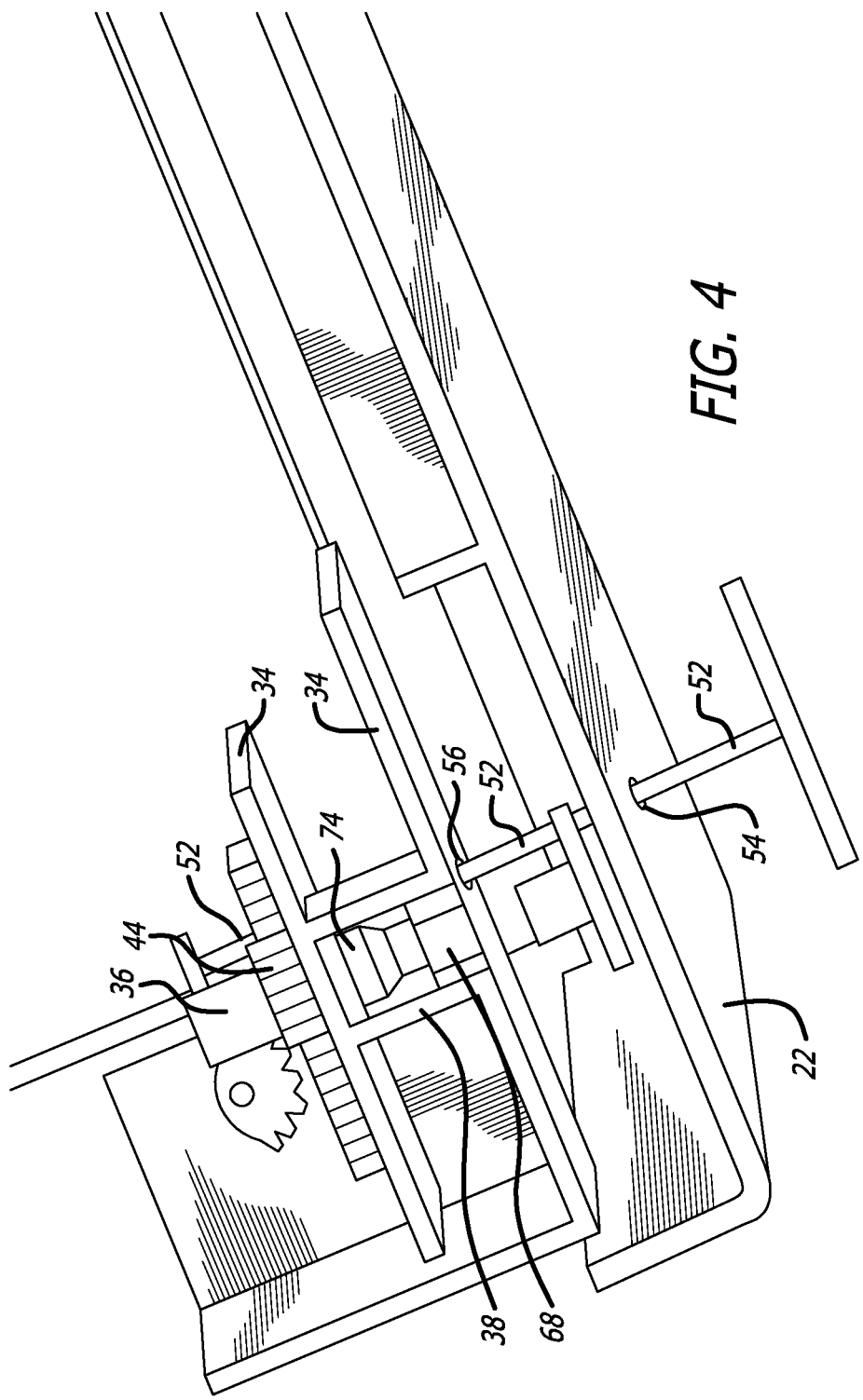
FIG. 4 is an enlarged perspective view of the door and latch mechanism of the latch assembly of FIG. 1.

Referring to FIGS. 1, 2 and 3, the release deployment latch includes a latch housing or bracket 34, typically mounted to the interior of the modular emergency oxygen container, a spur gear 36 connected to a cam 38, a gear rack 40 having a first row of gear rack teeth 42 operationally connected to spur gear teeth 44, and a manual release gear lever or crank 46 having manual release gear teeth 48 operationally connected to a second row of gear rack teeth 50.

Figure 9:
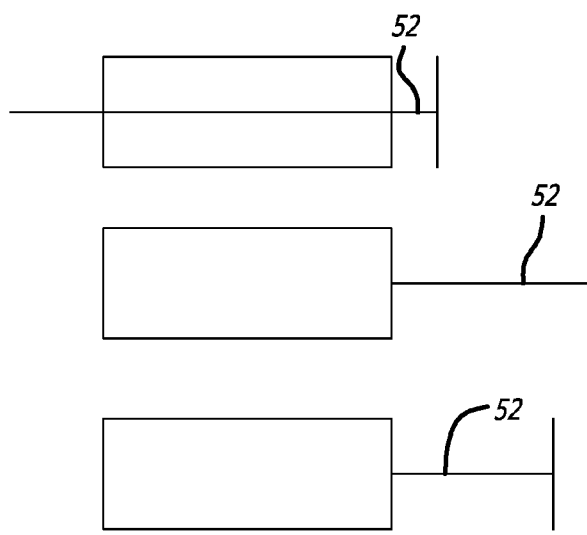
FIG. 9 is a schematic diagram illustrating positions of the plunger pin correlated with corresponding pressure testing of an emergency oxygen system operated by the latch assembly of FIG. 1.

An external manual release actuator pin, knob or test lever 52 is moveably mounted through an aperture 54 in the main door, and extends through one or more apertures 56 in the latch housing or bracket to engage an arm portion 58 of the manual release gear lever or crank. The manual release actuator pin or knob is moveable between first, second and third inwardly extending positions illustrated in FIG. 9, corresponding to the closed position, intermediate test position, and open position of the door, respectively. The external manual release actuator pin, knob or test lever controls the movement of a plunger pin that effects positioning of the main door from the closed or locked position to the intermediate test position for testing deployment of the supplemental oxygen system, or to the fully opened position for deployment of the supplemental oxygen system, as will be explained further below. For manual release, the external manual release actuator pin, knob or test lever pushes and lifts the arm end of the manual release gear lever or crank. This movement of the arm end will cause the manual release gear lever or crank to rotate counter-clockwise about a pivot point, which in turn causes the gear rack to move to the right, as shown in FIG. 3. The linear movement of the gear rack will cause a corresponding rotation of the spur gear and the cam.

The gear rack also includes an arm 60 engaged with a powered actuator 62, which is preferably a miniature light weight motor, such as a piezoelectric squiggle motor, or an equivalent pneumatic actuator, for example, so that the latch can be controlled manually or by powered actuation of the gear rack, that in turn controls rotation of the spur gear and cam. For manual release, the external manual release actuator pin, rod, knob or test lever pushes and lifts the arm end of the crank gear. For automatic operation, the movement of the pinion rack can be controlled by the pushing force of the shaft of a squiggle motor or piezoelectric motor with sufficient power, or pneumatic means with sufficient pressure.

Figure 5:
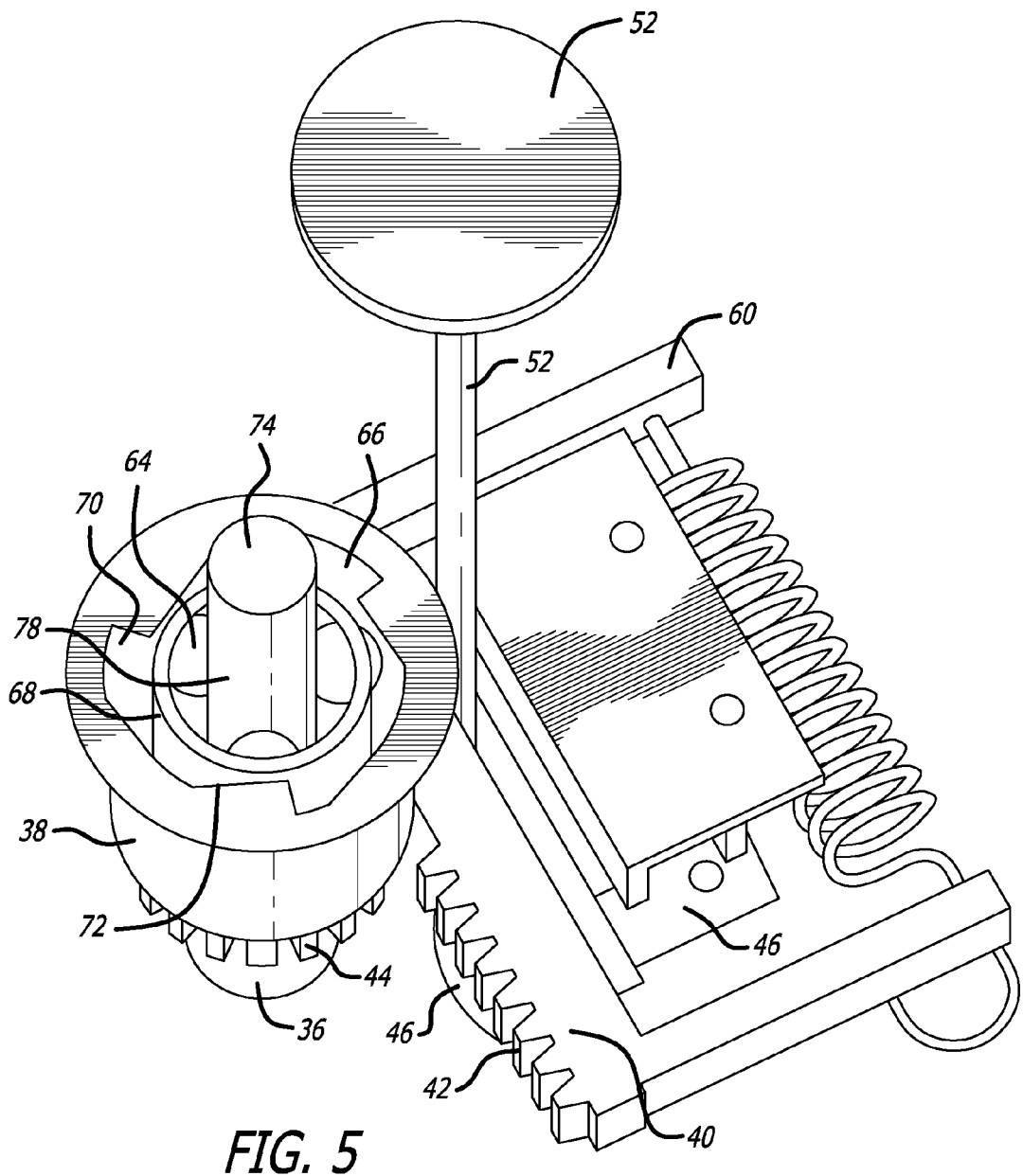
FIG. 5 is a bottom perspective view of a portion of the latch assembly of FIG. 1.
Figure 6:
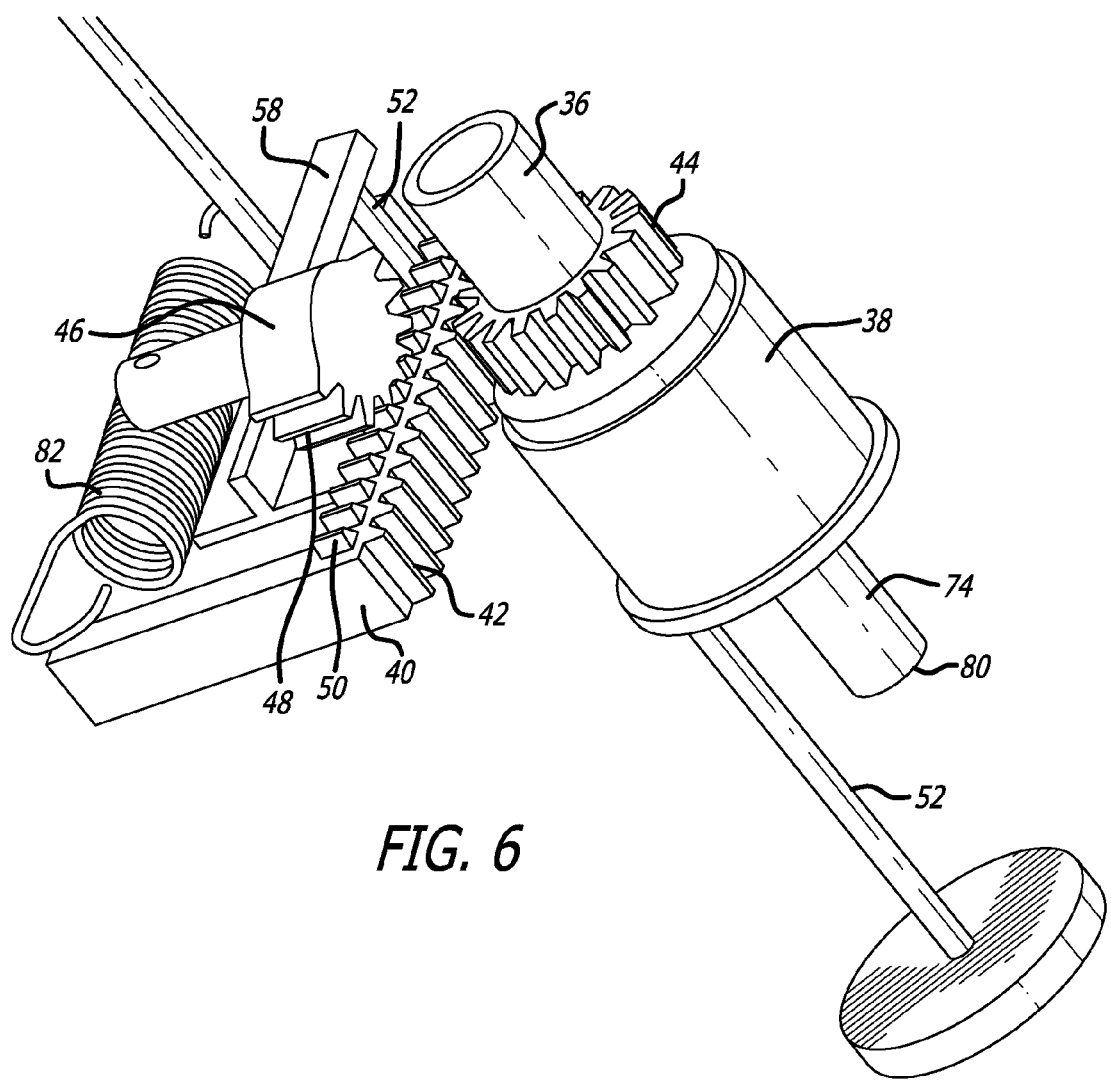
FIG. 6 is a schematic perspective view of the gear mechanism of the latch assembly of FIG. 1.
Figure 7:
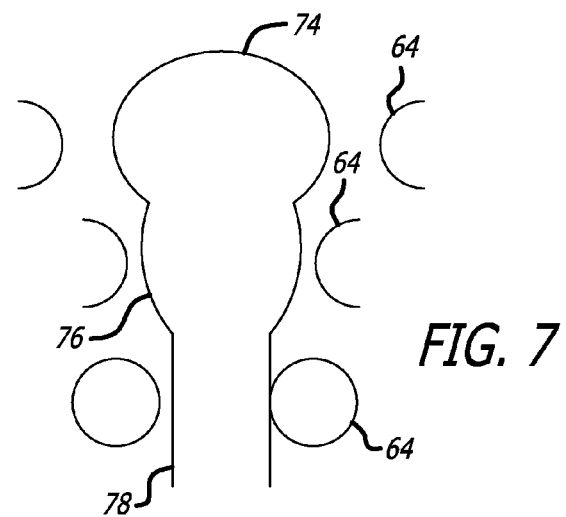
FIG. 7 is a schematic diagram illustrating positions of the external manual release actuator pin of the latch assembly of FIG. 1.
Figure 8:
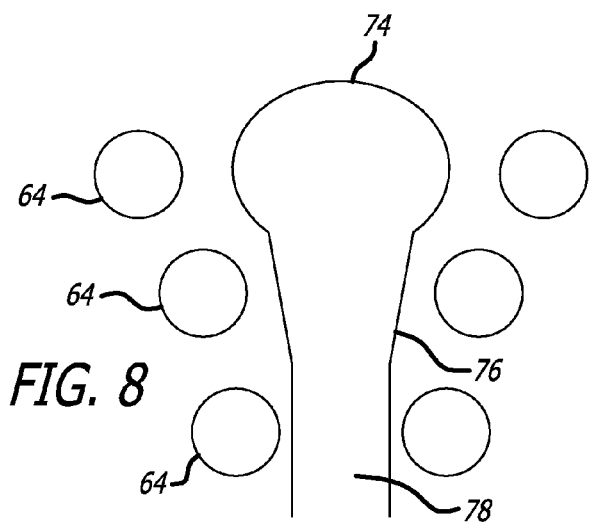
FIG. 8 is a schematic diagram illustrating positions of the plunger pin correlated with corresponding positions of the main door of the latch assembly of FIG. 1.

As is shown in FIG. 5, the cam contains a plurality of balls or ball bearings 64, such as three balls, for example, retained for movement within the cam along the inner cam profile 66 by a retaining ring 68 allowing for radial inward and outward movement of the balls. The inner cam profile includes a plurality of identical cam paths 70, such as three identical cam paths for the three balls, positioned 120° apart, to cause the plurality of balls to move radially outwards or inwards simultaneously together as the cam is rotated. Each cam path has three short circular segments 72 with three different calculated radii from the center of the cam to achieve the required outward or inward radial movement of the balls, in conjunction with corresponding varying diameters of portions of a plunger pin 74 along the length of the plunger pin, to cause the plunger pin to move correspondingly longitudinally outwardly or inwardly in relation to the main door of the container. The plurality of balls or ball bearings engage and press against an outer surface 76 of the shaft 78 of the latch plunger pin having an end 80 that engages a portion of the main door, so that longitudinal movement of the plunger pin can move the plunger pin from an innermost position corresponding to the closed position of the main door, to an intermediate position corresponding to the intermediate test position of the main door, to an outermost position corresponding to an open position of the main door, as is illustrated in FIG. 7. The positions of the plunger pin can also be used to trigger pressure testing of the supplemental oxygen, as is illustrated in FIG. 8. A spring 82 with sufficient pull force is connected between the arm of the gear rack and the housing to bias the gear rack or pinion rack and other releasing mechanisms back to their normal resting positions to keep the door in a closed position until the manual release pin or powered actuator are activated.

In FIG. 5, in which the latch is shown upside down with respect to its installed condition in an aircraft, the balls as shown are in a non-deployed state of the latch. If the cam housing is rotated counterclockwise, due to rotation of the spur gear, to the intermediate position, the balls will be caused to move into a corresponding recessed intermediate position that will release the latch partially. Additional rotation in the same direction causes the balls to fall into a further recessed state due to a deeper cavity, and this in effect would fully release the plunger, to release the latch completely. As the cam housing rotates, depending on its direction, would either open the door (drop down), which is facilitated by gravity, or lift up from the open position. A spring may also be connected to the main door to provide a mechanism for releasing and opening the main door under no power, and to facilitate reverse closing movement of the main door. Release of oxygen also is achieved along with deployment of one or more oxygen masks when the container door falls open.

The improved latch for a door of an emergency oxygen container is a key element of an emergency oxygen container deployment system. The latch can be activated to release the container door to move to an open position so that an oxygen mask can be deployed in front of a user. During an actuation sequence either an electrical or pneumatic pulse is commonly provided to the latch mechanism to release the door within an acceptable time frame to ensure that supplemental oxygen is made available within a stipulated time frame.

It can thus be seen that the advanced latch for emergency oxygen container deployment according to the present invention has a manual release capability that can be achieved by pushing an external manual release actuator pin, knob or test lever, such that when pushed to an intermediate position, the manual release actuator pin releases the latch to an intermediate position by rotating the gear mechanism of the latch, while pushing the manual release actuator pin further releases the latch completely, causing the door to open. The same result can be obtained automatically by utilizing a small, light weight motor, or an equivalent pneumatic actuator mechanism to rotate the gear mechanism of the latch. The latch is an integral part of an a modular emergency oxygen container for aircraft providing a source of supplemental breathable oxygen, and release of oxygen is achieved upon deployment of one or more oxygen masks when the container door opens.

The advanced latch for emergency oxygen container deployment according to the present invention is compact, and can be operated in multiple modes, including a manual mode, and a powered mode, such as by pneumatic or electrical powered actuation, for example, depending on the configuration. The advanced latch for emergency oxygen container deployment according to the present invention includes auto test functionality when the latch is configured to be actuated in a powered mode, such as by use of squiggle motor, for example, or with pneumatics. The test lever allows for visual inspection of an emergency oxygen container by pushing or pulling of an external manual actuation pin in a control area, and once such visual inspection is completed, the door of the emergency oxygen container can be opened or closed remotely and automatically, thereby saving maintenance check time. The test lever could also be actuated automatically by employing an electric motor with sufficient power or a pneumatic actuator with sufficient pressure.

All material of constructions are preferably resistant to chemicals to which the latch may be exposed in an aircraft, such as cleaning agents or insecticides, for example. With use of sufficient power, the device can overcome problems associate with poor mask packing. In addition, the cam and ball mechanism allows greater control over securing of the container main door, and facilitates better alignment of the container main door with a baggage or stowage compartment contour. The binding of typical latches is eliminated in this design due to better alignment of the door, which in effect makes operation of the door of the emergency oxygen system more robust in overcoming problems of misalignment of an emergency oxygen container assembly.

It should be appreciated that the improved latch for a door of an emergency oxygen container according to the present invention may also include an indicator, such as an indicator at a location that is visible to a user and others when the latch is in the intermediate test position for testing whether the emergency or supplemental oxygen system is functioning and operating as intended. It also should be appreciated that the improved latch for a door of an emergency oxygen container according to the present invention may be configured to open the container main door for deployment of the as part of an automatic response to sensing of altitude of the aircraft when deployment of the emergency or supplemental oxygen system is required.

It will be apparent from the foregoing that, while particular forms of the invention have been illustrated and described, various modifications can be made without departing from the spirit and scope of the invention. Accordingly, it is not intended that the invention be limited, except as by the appended claims.

We claim:
1. A release deployment latch for controlling operation of an aircraft emergency oxygen container having a source of breathable oxygen, the release deployment latch comprising:
   a main door of the aircraft emergency oxygen container moveable between a closed position, an intermediate test position, and an open position, said main door having a first aperture therethrough;

a latch housing configured to be mounted to an interior of the emergency oxygen container, said latch housing having at least one second aperture therethrough;

a spur gear having exterior spur gear teeth, said spur gear being rotatably mounted to the latch housing;

a cam connected to said spur gear, said cam including an interior channel having an inner cam profile defining a plurality of identical cam paths along a plurality of circular segments with different radii from a center of the cam;

a plurality of balls disposed within and retained for movement within said interior channel in said cam, said plurality of balls being configured to move radially inwardly and outwardly along said inner cam profile of said interior channel, said plurality of identical cam paths being configured to cause the plurality of balls to move radially outwards or inwards simultaneously as the cam is rotated;

a plunger pin disposed within and retained for movement within said plurality of balls, said plunger pin having an outer end configured to engage a portion of said main door, said plunger pin having a shaft with an outer surface having varying diameters along a length of the shaft of the plunger pin, such that said plurality of balls engage and press against the outer surface of said shaft of the latch plunger pin, and movement of said plurality of balls radially outwards or inwards simultaneously causes said plunger pin to move correspondingly longitudinally outwardly or inwardly in relation to said main door, such that longitudinal movement of the plunger pin moves the plunger pin from an innermost position corresponding to the closed position of the main door, to an intermediate position corresponding to the intermediate test position of the main door, to an outermost position corresponding to an open position of the main door;

a linear gear rack having first and second sides and corresponding first and second rows of gear rack teeth on said first and second sides of said linear gear rack, respectively, said first row of gear rack teeth being operationally engaged with said exterior spur gear teeth, and said gear rack including an auxiliary arm;

a manual release gear lever having manual release gear teeth operationally engaged with said second row of gear rack teeth, said manual release gear lever including an arm portion;

an external manual release actuator pin moveably mounted for slidable movement through and extending through said first aperture in the main door, said external manual release actuator pin having an exterior end disposed outside said main door, said external manual release actuator pin extending through the at least one second aperture in the latch housing and having an interior end configured to engage said arm portion of said manual release gear lever, said external manual release actuator pin being moveable between first, second and third inwardly extending positions corresponding to said closed position, intermediate test position, and open position of the main door, respectively, said external manual release actuator pin being operative to control movement of the plunger pin to effect positioning of the main door from the closed or locked position to the intermediate test position for testing deployment of the supplemental oxygen system, and to the fully opened position for deployment of the supplemental oxygen system, and said external manual release actuator pin being operative to push and lift the arm end of the manual release gear lever to rotate the manual release gear level to cause the gear rack to move to cause corresponding rotation of the spur gear and the cam manual operation of the main door; and a powered actuator engaged with said auxiliary arm of said gear rack configured to actuate movement of said gear rack to in turn control rotation of the spur gear and cam.

2. The release deployment latch of claim 1, wherein said plurality of balls comprises three balls, and said plurality of identical cam paths comprises three identical cam paths for the three balls.

3. The release deployment latch of claim 2, wherein said three identical cam paths are positioned 120° apart.

4. The release deployment latch of claim 2, wherein said plurality of cam paths comprises three short circular segments with three different calculated radii from the center of the cam to achieve a required outward or inward radial movement of the balls.

5. The release deployment latch of claim 1, wherein the intermediate position of the plunger pin triggers pressure testing of supplemental oxygen.

6. The release deployment latch of claim 1, further comprising a spring connected between the arm of the gear rack and the housing to bias the gear rack to a normal resting position and to bias the main door to a closed position.

7. The release deployment latch of claim 1, wherein said powered actuator comprises a miniature light weight motor.

8. The release deployment latch of claim 1, wherein said powered actuator comprises a piezoelectric squiggle motor.

9. The release deployment latch of claim 1, wherein said powered actuator comprises a pneumatic actuator.

10. The release deployment latch of claim 1, further comprising an indicator at a location within the aircraft emergency oxygen container that is visible to a user when the latch is in the intermediate test position for testing whether the emergency or supplemental oxygen system is functioning and operating as intended.

11. The release deployment latch of claim 1, wherein said latch is configured to open the main door as part of an automatic response to sensing of altitude of the aircraft when deployment of the emergency or supplemental oxygen system is required.

12. A release deployment latch for controlling operation of an aircraft emergency oxygen container having a source of breathable oxygen, the release deployment latch comprising:

a main door of the aircraft emergency oxygen container moveable between a closed position, an intermediate test position, and an open position, said main door having a first aperture therethrough;

a latch housing configured to be mounted to an interior of the emergency oxygen container, said latch housing having at least one second aperture therethrough;

a spur gear having exterior spur gear teeth, said spur gear being rotatably mounted to the latch housing;

a cam connected to said spur gear, said cam including an interior channel having an inner cam profile defining a plurality of identical cam paths along a plurality of circular segments with different radii from a center of the cam;

a plurality of balls disposed within and retained for movement within said interior channel in said cam, said plurality of balls being configured to move radially inwardly and outwardly along said inner cam profile of said interior channel, said plurality of identical cam paths being configured to cause the plurality of balls to move radially outwards or inwards simultaneously as the cam is rotated;

a plunger pin disposed within and retained for movement within said plurality of balls, said plunger pin having an outer end configured to engage a portion of said main door, said plunger pin having a shaft with an outer surface having varying diameters along a length of the shaft of the plunger pin, such that said plurality of balls engage and press against the outer surface of said shaft of the latch plunger pin, and movement of said plurality of balls radially outwards or inwards simultaneously causes said plunger pin to move correspondingly longitudinally outwardly or inwardly in relation to said main door, such that longitudinal movement of the plunger pinmoves the plunger pin from an innermost position corresponding to the closed position of the main door, to an intermediate position corresponding to the intermediate test position of the main door, to an outermost position corresponding to an open position of the main door;

a linear gear rack having first and second sides and corresponding first and second rows of gear rack teeth on said first and second sides of said linear gear rack, respectively, said first row of gear rack teeth being operationally engaged with said exterior spur gear teeth, and said gear rack including an auxiliary arm;

a manual release gear lever having manual release gear teeth operationally engaged with said second row of gear rack teeth, said manual release gear lever including an arm portion;

an external manual release actuator pin moveably mounted for slidable movement through and extending through said first aperture in the main door, said external manual release actuator pin having an exterior end disposed outside said main door, said external manual release actuator pin extending through the at least one second aperture in the latch housing and having an interior end configured to engage said arm portion of said manual release gear lever, said external manual release actuator pin being moveable between first, second and third inwardly extending positions corresponding to said closed position, intermediate test position, and open position of the main door, respectively, said external manual release actuator pin being operative to control movement of the plunger pin to effect positioning of the main door from the closed or locked position to the intermediate test position for testing deployment of the supplemental oxygen system, and to the fully opened position for deployment of the supplemental oxygen system, and said external manual release actuator pin being operative to push and lift the arm end of the manual release gear lever to rotate the manual release gear level to cause the gear rack to move to cause corresponding rotation of the spur gear and the cam manual operation of the main door, and said gear rack including a spring connected between the arm of the gear rack and the housing to bias the gear rack to a normal resting position and to bias the main door to a closed position; and a powered actuator engaged with said auxiliary arm of said gear rack configured to actuate movement of said gear rack to in turn control rotation of the spur gear and cam.

13. The release deployment latch of claim 12, wherein said plurality of balls comprises three balls, and said plurality of identical cam paths comprises three identical cam paths for the three balls.

14. The release deployment latch of claim 13, wherein said three identical cam paths are positioned 120° apart.

15. The release deployment latch of claim 13, wherein said plurality of cam paths comprises three short circular segments with three different calculated radii from the center of the cam to achieve a required outward or inward radial movement of the balls.

16. The release deployment latch of claim 12, wherein the intermediate position of the plunger pin triggers pressure testing of supplemental oxygen.

17. The release deployment latch of claim 12, wherein said powered actuator comprises a miniature light weight motor.

18. The release deployment latch of claim 12, wherein said powered actuator comprises a piezoelectric squiggle motor.

19. The release deployment latch of claim 12, wherein said powered actuator comprises a pneumatic actuator.

20. The release deployment latch of claim 12, further comprising an indicator at a location within the aircraft emergency oxygen container that is visible to a user when the latch is in the intermediate test position for testing whether the emergency or supplemental oxygen system is functioning and operating as intended.

* * * * *